(12) United States Patent
Yuza

(10) Patent No.: US 9,389,395 B2
(45) Date of Patent: Jul. 12, 2016

(54) IMAGING LENS

(71) Applicant: KANTATSU CO., LTD., Yaita-shi, Tochigi (JP)

(72) Inventor: Shingo Yuza, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 14/573,165

(22) Filed: Dec. 17, 2014

(65) Prior Publication Data

US 2015/0378129 A1  Dec. 31, 2015

(30) Foreign Application Priority Data

Jun. 27, 2014  (JP) ................................. 2014-132255

(51) Int. Cl.
*G02B 13/00* (2006.01)
*G02B 9/34* (2006.01)

(52) U.S. Cl.
CPC ................. *G02B 13/004* (2013.01); *G02B 9/34* (2013.01)

(58) Field of Classification Search
CPC ......... G02B 13/004; G02B 9/34; G02B 13/18
USPC ................................................ 359/715, 773
See application file for complete search history.

(56) References Cited

U.S. PATENT DOCUMENTS

| 2012/0194925 A1* | 8/2012 | Teraoka | G02B 13/004 359/773 |
| 2012/0194926 A1* | 8/2012 | Kubota | G02B 13/004 359/773 |
| 2014/0198397 A1* | 7/2014 | Sekine | G02B 13/004 359/715 |

FOREIGN PATENT DOCUMENTS

| JP | 2008-033327 A | 2/2008 |
| JP | 2009-265245 A | 11/2009 |

* cited by examiner

*Primary Examiner* — Scott J Sugarman
(74) *Attorney, Agent, or Firm* — Westerman, Hattori, Daniels & Adrian, LLP

(57) ABSTRACT

A compact, small F-value imaging lens with a wide field of view which corrects aberrations properly. Its elements are arranged in order from an object side to an image side: an aperture stop, a positive first lens having convex surfaces on the object and image sides, a negative second lens having a concave image-side surface, a meniscus positive third lens having a convex image-side surface, and a negative double-sided aspheric fourth lens having a concave image-side surface. With an F-value smaller than 2.4, it satisfies conditional expressions (1) to (3):

$$0.8 < ih/f < 0.95 \quad (1)$$

$$TLA/2ih < 0.9 \quad (2)$$

$$-4.0 < r3/r4 < 6.0 \quad (3)$$

where
ih: maximum image height
f: focal length of the imaging lens overall optical system
TLA: total track length
r3: curvature radius of the second lens object-side surface
r4: curvature radius of the second lens image-side surface.

6 Claims, 12 Drawing Sheets

IMAGING LENS

The present application is based on and claims priority of Japanese patent application No. 2014-132255 filed on Jun. 27, 2014, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device, and more particularly to imaging lenses which are built in image pickup devices mounted in increasingly compact and low-profile mobile terminals such as smartphones, mobile phones and PDAs (Personal Digital Assistants), game consoles, information terminals such as PCs, and home appliances and wearable devices.

2. Description of the Related Art

In recent years, the market of compact image pickup devices has been ever-expanding with the spread of the use of image pickup devices in mobile terminals including smartphones, various home appliances and more recently so-called wearable information terminals. The cameras mounted in these products are expected to deliver high performance to cope with an increase in the number of pixels and at the same time be more compact and offer a wide field of view so as to be applicable to various types of products and provide high resolution and high brightness to cope with high-pixel image sensors.

As imaging lenses which meet the trend toward higher performance as mentioned above, many types of imaging lens composed of four constituent lenses (four-element imaging lenses) have been proposed, because an imaging lens comprised of four constituent lenses can be relatively compact and deliver high performance and can be supplied at low cost.

For example, JP-A-2008-033327 (Patent Document 1) discloses an imaging lens which includes a first lens with positive refractive power as a biconvex lens, a second lens with negative refractive power as a meniscus lens having a convex surface on an object side, a third lens with positive refractive power as a meniscus lens having a convex surface on an image side, and a fourth lens with negative refractive power, in which the length of the overall optical system in the optical axis direction and the ratio of the focal length of the first lens to the total focal length are set within appropriate ranges in order to achieve compactness and high performance.

JP-A-2009-265245 (Patent Document 2) discloses an imaging lens which includes, in order from an object side, a first lens with positive refractive power having a convex surface on the object side, an aperture stop for adjusting the quantity of light, a second lens with negative refractive power, a third lens with positive refractive power having a concave surface on the object side, and a fourth lens with negative refractive power, in which the ratio between the focal length of the overall optical system and the focal length of the second lens and the ratio between the focal length of the second lens and the curvature radius of the object-side surface of the second lens are set within appropriate ranges in order to achieve compactness and high performance.

In the imaging lens described in Patent Document 1, not only its configuration as mentioned above but also the use of glass material for the second lens contribute to its compactness and high performance. In addition, the ratio of the total track length to the diagonal length of the effective imaging plane of the image sensor (hereinafter referred to as the "total length to diagonal ratio") is about 1.0, suggesting that the imaging lens is relatively compact. However, its F-value is about 3.0, so its brightness is not considered to be sufficient for an image sensor which deals with an increasing number of pixels. Also, its half field of view is in the range of 31 to 32 degrees, which is insufficient to meet the recent demand for a wide field of view.

The total length to diagonal ratio of the imaging lens described in Patent Document 2 is about 1.0, suggesting that the imaging lens is relatively compact. However, its F-value is about 2.8, so its brightness is not considered to be sufficient for an image sensor which deals with an increasing number of pixels. Also, its half field of view is in the range of 31 to 32 degrees, which is insufficient to meet the recent demand for a wide field of view.

SUMMARY OF THE INVENTION

The present invention has been made in view of the above problem and an object thereof is to provide an imaging lens which meets the demand for compactness, corrects various aberrations properly with a small F-value and offers a wide field of view.

In the present invention, a "compact" imaging lens means an imaging lens in which the total track length is shorter than the diagonal length of the effective imaging plane of the image sensor, namely the total length to diagonal ratio is much smaller than 1.0. Also, a "small F-value" here means that the F-value is 2.4 or less and a "wide field of view" here means that the field of view is 75 degrees or more. As mentioned above, it is difficult for the conventional techniques to meet all these demands at the same time.

In the present invention, in terms of lens surface shape, a convex surface or a concave surface means that the paraxial portion of the surface (near the optical axis) is convex or concave. A "pole-change point" on an aspheric surface here means a point on an aspheric surface at which a tangential plane intersects the optical axis perpendicularly.

According to one aspect of the present invention, there is provided an imaging lens in which elements are arranged in the following order from an object side to an image side: an aperture stop; a first lens with positive refractive power having a convex surface on each of the object side and the image side; a second lens with negative refractive power having a concave surface on the image side; a third lens with positive refractive power as a meniscus lens having a convex surface on the image side; and a fourth lens with negative refractive power as a double-sided aspheric lens having a concave surface on the image side. Its F-value is smaller than 2.4 and it satisfies conditional expressions (1) to (3) below:

$$0.8 < ih/f < 0.95 \quad (1)$$

$$TLA/2ih < 0.9 \quad (2)$$

$$-4.0 < r3/r4 < 6.0 \quad (3)$$

where f: focal length of the overall optical system of the imaging lens ih: maximum image height TLA: distance on the optical axis from the objet-side surface of an optical element located nearest to the object to the image plane with the filter or the like removed (total track length)

r3: curvature radius of the object-side surface of the second lens r4: curvature radius of the image-side surface of the second lens.

The imaging lens is a telephoto lens system in which positive, negative, positive, and negative refractive power lenses are arranged in order from the object side. The refractive power of the imaging lens is appropriately distributed to its constituent lenses so as to shorten the focal length of the overall optical system, thereby offering a wide field of view. Each constituent lens surface is appropriately shaped to increase the telephoto capability and ensure compactness so that the imaging lens can correct various aberrations properly in spite of its small F-value.

The first lens is a biconvex lens and its positive refractive power is appropriately distributed to the both convex surfaces so as to make the curvature radii of the lens surfaces small, suppress increase in manufacturing error sensitivity, and shorten the total track length. The both surfaces of the first lens may be aspheric and in that case, spherical aberrations which occur on the first lens can be corrected.

The second lens corrects chromatic aberrations which occur on the first lens and effectively suppresses paraxial spherical aberrations, off-axial astigmatism, and coma aberrations. The both surfaces of the second lens may be aspheric and in that case, such off-axial aberrations are corrected and suppressed more effectively due to the aspheric surfaces.

The third lens and the fourth lens are responsible for correction of off-axial astigmatism, reduction of astigmatic difference and correction of distortion. The aspheric shapes of the both surfaces of the fourth lens make it easy to control the angle of a chief ray incident on the image sensor (hereinafter called CRA or Chief Ray Angle). The third lens may have an aspheric surface and if so, various aberrations are corrected more effectively.

The aperture stop is located between the intersection of the object-side surface of the first lens and the optical axis and the periphery of the object-side surface of the first lens. The aperture stop is located nearest to the object in the lens system and the exit pupil is remoter from the image plane, thereby keeping the CRA small. The aspheric surfaces of the fourth lens are responsible for control of the CRA and in this connection, the aperture stop, located nearest to the object in the optical system, prevents the fourth lens from being compelled to have a sharply curved aspheric surface. Consequently, the internal reflection of the fourth lens is suppressed, making it easy to suppress ghost phenomena. If the location of the aperture stop is nearer to the object with an air gap between it and the first lens, from the viewpoint of compactness, undesirably the total track length would be longer, though the CRA would be kept small.

The conditional expression (1) is related to the field of view of the imaging lens. As is generally known, half field of view $\omega$ of an optical system is expressed by the equation $\omega=\tan^{-1}(ih/f)$, where ih denotes the maximum image height and f denotes the focal length of the overall optical system, provided that the influence of various aberrations is ignored. The range defined by the conditional expression (1) corresponds to the range of imaging fields of view from 77 degrees to 87 degrees. If the value is above the upper limit of the conditional expression (1), the field of view would be too wide to correct aberrations in the peripheral area of the image. On the other hand, if the value is below the lower limit of the conditional expression (1), it would be impossible to meet the recent demand for a wide field of view, though it would be advantageous in correcting aberrations and improving optical performance.

The conditional expression (2) defines an appropriate range for the ratio of the total track length of the imaging lens to the image sensor size (twice the maximum image height), and indicates a condition to ensure compactness. When the value is below the upper limit of the conditional expression (2), the total length to diagonal ratio is small so that the imaging lens is applicable to a low-profile device. The maximum image height ih in the conditional expression (2) is taken as equal to half the diagonal length of the effective imaging plane of the image sensor.

The conditional expression (3) defines an appropriate range for the ratio of the curvature radius of the object-side surface of the second lens to the curvature radius of its image-side surface representing the shape of the second lens, and indicates a condition to suppress increase in the manufacturing error sensitivity of the second lens and correct aberrations properly. If the value is above the upper limit of the conditional expression (3) (the second lens is a biconcave lens), the refractive power of the second lens would be too strong and its manufacturing error sensitivity would increase. On the other hand, if the value is below the lower limit of the conditional expression (3) (the second lens is a meniscus lens), the refractive power of the second lens would be too weak to correct spherical aberrations and chromatic aberrations.

The imaging lens with the above configuration can be compact and can correct aberrations in the peripheral area of the image which increase as the F-value is smaller and the field of view is wider.

Preferably, the imaging lens satisfies a conditional expression (4) below:

$$1.1 < f1/f3 < 1.6 \qquad (4)$$

where
f1: focal length of the first lens
f3: focal length of the third lens.

The conditional expression (4) defines an appropriate range for the ratio of the focal length of the first lens to the focal length of the third lens representing the relation between the refractive power of the first lens and the refractive power of the third lens, and indicates a condition to suppress increase in the manufacturing error sensitivity of the first lens and keep the total track length short. If the value is above the upper limit of the conditional expression (4), the positive refractive power of the first lens would be relatively too weak to shorten the total track length. On the other hand, if the value is below the lower limit of the conditional expression (4), the positive refractive power of the first lens would be relatively too strong, undesirably resulting in higher manufacturing error sensitivity.

Preferably, the imaging lens satisfies a conditional expression (5) below:

$$2.0 < f2/f4 < 4.0 \qquad (5)$$

where
f2: focal length of the second lens
f4: focal length of the fourth lens.

The conditional expression (5) defines an appropriate range for the ratio of the focal length of the second lens to the focal length of the fourth lens representing the relation between the refractive power of the second lens and the refractive power of the fourth lens, and indicates a condition to suppress increase in the manufacturing error sensitivity of the second lens. If the value is above the upper limit of the conditional expression (5), the negative refractive power of the second lens would be relatively too weak for the second lens to correct chromatic aberrations. On the other hand, if the value is below the lower limit of the conditional expression (5), the negative refractive power of the second lens would be relatively too strong, resulting in higher manufacturing error sensitivity.

Preferably, the imaging lens satisfies a conditional expression (6) below:

$$-4.5 < r3/f < 5.5 \qquad (6)$$

where r3: curvature radius of the object-side surface of the second lens.

The conditional expression (6) defines an appropriate range for the ratio of the curvature radius of the object-side surface of the second lens to the focal length of the overall optical system, and indicates a condition to suppress spherical aberrations and suppress increase in the manufacturing error sensitivity of the second lens. If the value is above the upper limit of the conditional expression (6) (the object-side surface of the second lens is convex) or below the lower limit of the conditional expression (6) (the object-side surface of the second lens is concave), the refractive power of the object-side surface of the second lens would be weaker. In that case, the image-side surface of the second lens would have to compensate for negative refractive power insufficiency, resulting in a tendency for the second lens to have high manufacturing error sensitivity. When the conditional expression (6) is satisfied, spherical aberrations are corrected properly and the manufacturing error sensitivity is kept low.

Preferably, the imaging lens satisfies a conditional expression (7) below:

$$2.8 < r5/r6 < 5.0 \qquad (7)$$

where r5: curvature radius of the object-side surface of the third lens
r6: curvature radius of the image-side surface of the third lens.

The conditional expression (7) defines an appropriate range for the ratio of the curvature radius of the object-side surface of the third lens to the curvature radius of its image-side surface representing the shape of the third lens, and indicates a condition to ensure compactness and an appropriate back focus. If the value is above the upper limit of the conditional expression (7), the refractive power of the third lens would be too strong to ensure an appropriate back focus. On the other hand, if the value is below the lower limit of the conditional expression (7), the refractive power of the third lens would be too weak to keep the total track length short.

Preferably, the imaging lens satisfies a conditional expression (8) below:

$$-0.05 < f12/f34 < 0.80 \qquad (8)$$

where f12: composite focal length of the first lens and the second lens
f34: composite focal length of the third lens and the fourth lens.

The conditional expression (8) defines an appropriate range for the ratio of the composite focal length of the first and second lenses to the composite focal length of the third and fourth lenses, and indicates a condition to keep chromatic aberrations and other aberrations within appropriate ranges. If the value is above the upper limit of the conditional expression (8), the composite focal length of the first and second lenses would be relatively too long with respect to the composite focal length of the third and fourth lenses, making it difficult to correct chromatic aberrations and other aberrations and deliver high imaging performance. On the other hand, if the value is below the lower limit of the conditional expression (8), the composite focal length of the first and second lenses would be relatively too short with respect to the composite focal length of the third and fourth lenses and the refractive power of the lens system would concentrate on the first and second lenses, undesirably resulting in higher manufacturing error sensitivity.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, and 11 are schematic views showing the general configurations of the imaging lenses in Examples 1 to 6 according to this embodiment respectively. Since all these examples have the same basic lens configuration, the general configuration of an imaging lens according to this embodiment is mainly explained below referring to the schematic view of Example 1.

Figure 1:
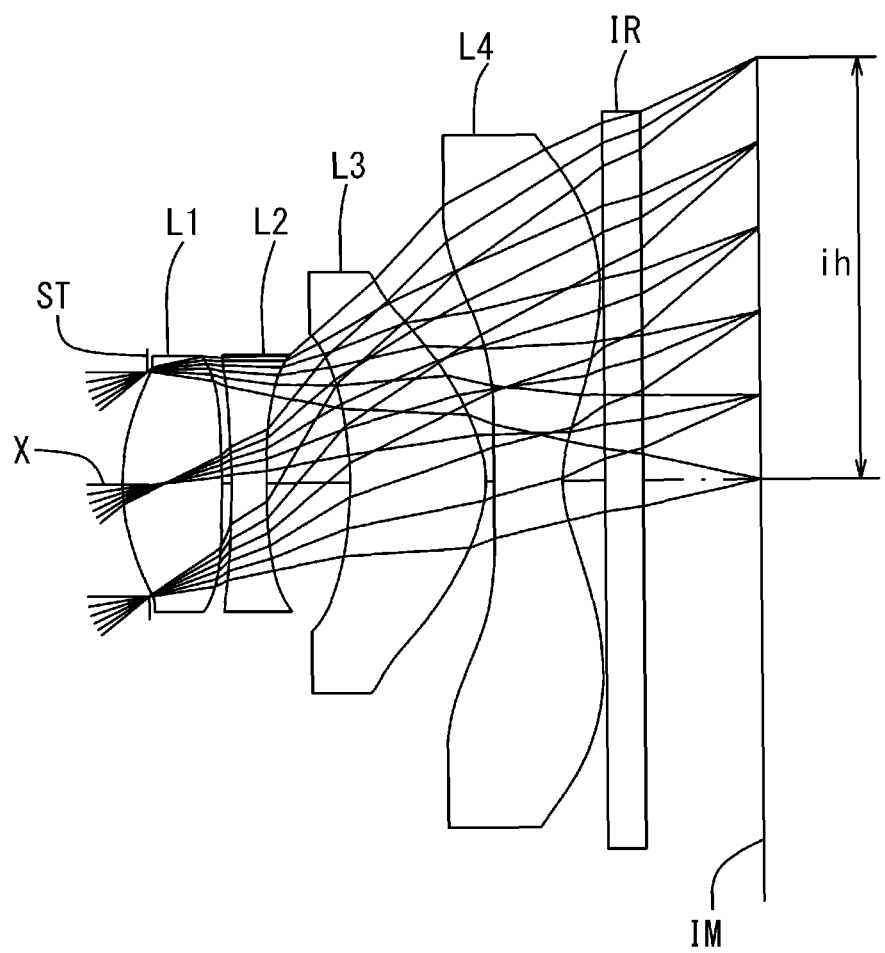
FIG. 1 is a schematic view showing the general configuration of an imaging lens in Example 1.

As shown in FIG. 1, in the imaging lens according to this embodiment, elements are arranged in the following order from an object side to an image side: an aperture stop ST, a first lens L1 with positive refractive power having a convex surface on each of the object side and the image side, a second lens L2 with negative refractive power having a concave surface on the image side, a third lens L3 with positive refractive power as a meniscus lens having a convex surface on the image side, and a fourth lens L4 with negative refractive power as a double-sided aspheric lens having a concave surface on the image side. This refractive power arrangement may be virtually that of a telephoto lens system, which implies that it is easy to shorten the total track length. The aperture stop ST is located on the object side of the first lens L1.

A filter IR is located between the fourth lens L4 and an image plane IM. The filter IR is omissible. In this embodiment, the total track length and back focus are calculated without the filter IR.

In the imaging lens composed of four constituent lenses as mentioned above, the first lens L1 is a biconvex lens and its positive refractive power is appropriately distributed to the both convex surfaces to make the curvature radii of the lens surfaces small to suppress increase in manufacturing error sensitivity and shorten the total track length. Each surface of the first lens L1 has an appropriate aspheric shape which can correct spherical aberrations which occur on the first lens L1.

The second lens L2 has a biconcave shape and effectively corrects chromatic aberrations which occur on the first lens L1 and effectively suppresses paraxial spherical aberrations, off-axial astigmatism, and coma aberrations. The both surfaces of the second lens L2 are aspheric so that off-axial aberrations are corrected more properly. The shape of the second lens L2 is not limited to a biconcave shape. For example, in Examples 4, 5, and 6 shown in FIGS. 7, 9, and 11 respectively, the second lens L2 is a meniscus lens in which the object-side surface is convex and the image-side surface is concave.

The third lens L3 has a meniscus shape with a convex surface on the image side and the fourth lens L4 has a meniscus shape with a concave surface on the image side. The both surfaces of each of the third lens L3 and the fourth lens L4 have appropriate aspheric shapes to correct off-axial astigmatism and distortion and reduce astigmatic difference. The image-side surface of the fourth lens L4 has an aspheric shape with pole-change points off an optical axis X and has the function to control the CRA and correct field curvature. The shape of the fourth lens L4 is not limited to the above shape; for example, it may be a biconcave lens as in Example 3 shown in FIG. 5.

The aperture stop ST is located between the intersection of the object-side surface of the first lens L1 and the optical axis X and the periphery of the object-side surface of the first lens L1. Since the aperture stop ST is thus located nearest to the object in the optical system and the exit pupil is remote from the image plane IM, the CRA is small.

In the imaging lens according to this embodiment, all the constituent lenses are made of plastic material, so the manufacturing process is easier and the imaging lens can be mass-produced at low cost. Since all the lens surfaces are aspheric, aberrations can be corrected more properly.

When the imaging lens according to this embodiment satisfies conditional expressions (1) to (8) below, it brings about advantageous effects:

$$0.8 < ih/f < 0.95 \quad (1)$$

$$TLA/2ih < 0.9 \quad (2)$$

$$-4.0 < r3/r4 < 6.0 \quad (3)$$

$$1.1 < f1/f3 < 1.6 \quad (4)$$

$$2.0 < f2/f4 < 4.0 \quad (5)$$

$$-4.5 < r3/f < 5.5 \quad (6)$$

$$2.8 < r5/r6 < 5.0 \quad (7)$$

$$-0.05 < f12/f34 < 0.80 \quad (8)$$

where
f: focal length of the overall optical system of the imaging lens
ih: maximum image height
TLA: distance on the optical axis from the objet-side surface of an optical element located nearest to the object to the image plane IM with the filter IR removed (total track length)
f1: focal length of the first lens L1
f2: focal length of the second lens L2
f3: focal length of the third lens L3
f4: focal length of the fourth lens L4
r3: curvature radius of the object-side surface of the second lens L2
r4: curvature radius of the image-side surface of the second lens L2
r5: curvature radius of the object-side surface of the third lens L3
r6: curvature radius of the image-side surface of the third lens L3
f12: composite focal length of the first lens L1 and the second lens L2
f34: composite focal length of the third lens L3 and the fourth lens L4.

When the imaging lens according to this embodiment satisfies conditional expressions (1a) to (8a) below, it brings about more advantageous effects:

$$0.8 < ih/f < 0.90 \quad (1a)$$

$$TLA/2ih < 0.8 \quad (2a)$$

$$-3.7 < r3/r4 < 5.5 \quad (3a)$$

$$1.2 < f1/f3 < 1.6 \quad (4a)$$

$$2.1 < f2/f4 < 3.6 \quad (5a)$$

$$-3.9 < r3/f < 4.9 \quad (6a)$$

$$3.1 < r5/r6 < 4.5 \quad (7a)$$

$$-0.03 < f12/f34 < 0.70 \quad (8a)$$

In the above conditional expressions, the signs have the same meanings as in the preceding paragraph.

When the imaging lens according to this embodiment satisfies conditional expressions (1b) to (8b) below, it brings about particularly advantageous effects:

$$0.81 \le ih/f \le 0.86 \quad (1b)$$

$$TLA/2ih \le 0.78 \quad (2b)$$

$$-3.37 \le r3/r4 \le 5.04 \quad (3b)$$

$$1.34 \le f1/f3 \le 1.52 \quad (4b)$$

$$2.31 \le f2/f4 \le 3.28 \quad (5b)$$

$$-3.57 \le r3/f \le 4.47 \quad (6b)$$

$$3.47 \le r5/r6 \le 4.10 \quad (7b)$$

$$-0.01 \le f12/f34 \le 0.60 \quad (8b)$$

In the above conditional expressions, the signs have the same meanings as in the paragraph before the preceding paragraph.

In this embodiment, all the lens surfaces are aspheric. The aspheric shapes of these lens surfaces are expressed by the following equation, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TLA denotes total track length with the filter IR removed. i denotes a surface number counted from the object side, r denotes a curvature radius, d denotes the distance on the optical axis between lens surfaces (surface distance), Nd denotes a refractive index at d-ray (reference wavelength), and νd denotes an Abbe number at d-ray. As for aspheric surfaces, an asterisk (*) after surface number i indicates that the surface concerned is an aspheric surface.

Example 1

The basic lens data of Example 1 is shown in Table 1 below.

TABLE 1

Example 1 in mm f = 2.82
Fno = 2.30
ω(deg) = 38.8
ih = 2.30
TLA = 3.40

Surface Data

| Surface No. i | Curvature Radius r | Surface Distance d | Refractive Index Nd | Abbe Number νd |
|---|---|---|---|---|
| (Object Surface) | Infinity | Infinity | | |
| Stop | Infinity | −0.140 | | |
| 1* | 1.180 | 0.541 | 1.5438 | 55.57 |
| 2* | −5.661 | 0.053 | | |
| 3* | −2.977 | 0.190 | 1.6349 | 23.97 |
| 4* | 9.657 | 0.454 | | |
| 5* | −2.123 | 0.739 | 1.5348 | 55.66 |
| 6* | −0.613 | 0.044 | | |
| 7* | 16.194 | 0.374 | 1.5348 | 55.66 |
| 8* | 0.639 | 0.230 | | |
| 9 | Infinity | 0.210 | 1.5168 | 64.20 |
| 10 | Infinity | 0.638 | | |
| Image Plane | Infinity | | | |

Constituent Lens Data

| Lens | Start Surface | Focal Length |
|---|---|---|
| 1 | 1 | 1.847 |
| 2 | 3 | −3.563 |
| 3 | 5 | 1.375 |
| 4 | 7 | −1.253 |

Composite Focal Length

| f12 | 3.141 |
|---|---|
| f34 | 157.654 |

Aspheric Surface Data

| | 1st Surface | 2nd Surface | 3rd Surface | 4th Surface |
|---|---|---|---|---|
| k | 0.000E+00 | 0.000E+00 | 0.000E+00 | −9.778E+00 |
| A4 | −7.170E−02 | 2.253E−01 | 7.881E−01 | 6.377E−01 |
| A6 | 4.515E−01 | −1.478E+00 | −2.821E+00 | −2.697E−01 |
| A8 | −2.817E+00 | 4.213E−01 | 3.625E+00 | −7.612E+00 |
| A10 | 6.805E+00 | 3.311E−01 | −3.835E−01 | 4.560E+01 |
| A12 | −7.731E+00 | −4.425E+00 | −1.333E+00 | −1.220E+02 |
| A14 | 0.000E+00 | 0.000E+00 | 0.000E+00 | 1.665E+02 |
| A16 | 0.000E+00 | 0.000E+00 | 0.000E+00 | −9.143E+01 |

| | 5th Surface | 6th Surface | 7th Surface | 8th Surface |
|---|---|---|---|---|
| k | 0.000E+00 | −4.069E+00 | 0.000E+00 | −6.250E+00 |
| A4 | 2.909E−02 | −2.226E−01 | −1.923E−01 | −2.050E−01 |
| A6 | 1.882E−01 | 1.632E−01 | −1.623E−01 | 1.490E−01 |
| A8 | −2.127E+00 | −2.824E−01 | 2.968E−01 | −9.805E−02 |
| A10 | 4.681E+00 | 2.705E−01 | −1.377E−01 | 4.630E−02 |

TABLE 1-continued

| A12 | −4.499E+00 | −1.388E−01 | 2.047E−02 | −1.426E−02 |
|---|---|---|---|---|
| A14 | 1.308E+00 | 1.613E−01 | 1.973E−03 | 2.475E−03 |
| A16 | 0.000E+00 | −8.158E−02 | −6.207E−04 | −1.787E−04 |

As shown in Table 7, the imaging lens in Example 1 satisfies all the conditional expressions (1) to (8).

Figure 2:
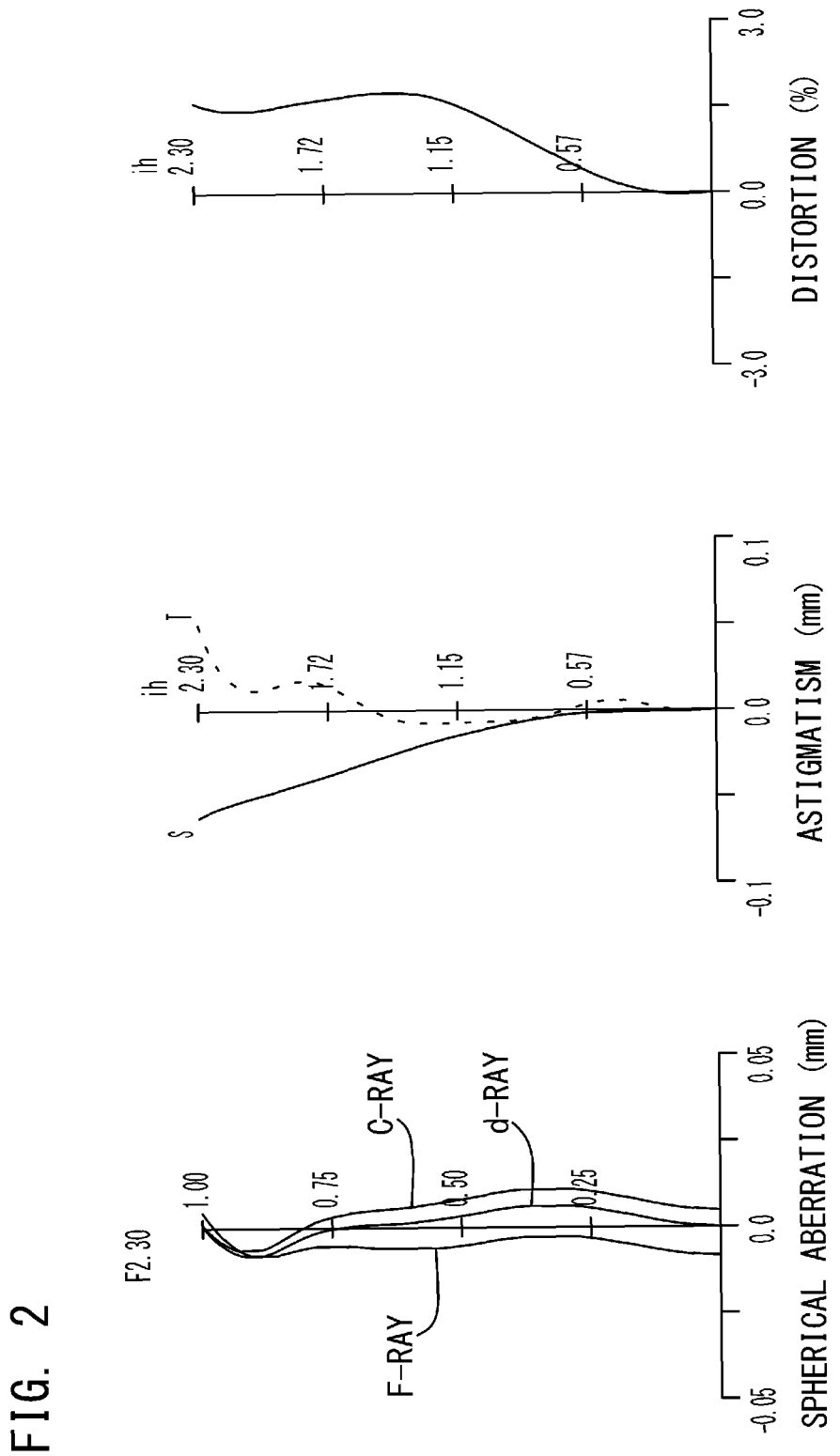
FIG. 2 shows spherical aberration, astigmatism, and distortion of the imaging lens in Example 1.
Figure 3:
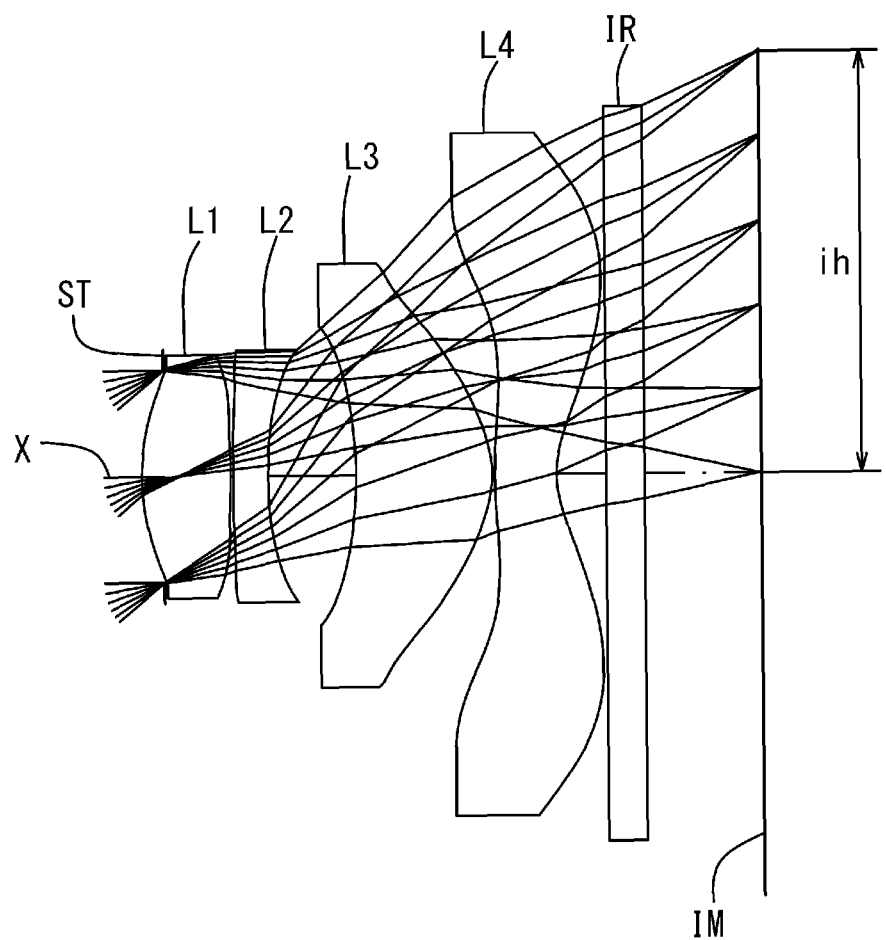
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on sagittal image surface S and the amount of aberration at d-ray on tangential image surface T (the same is true for FIGS. 4, 6, 8, 10, and 12). As shown in FIG. 2, each aberration is corrected properly.

In Example 1, total track length TLA is 3.40 mm, suggesting that the imaging lens is compact. Also, the imaging lens provides a wide field of view of about 78 degrees and high brightness with an F-value of about 2.3.

Example 2

The basic lens data of Example 2 is shown in Table 2 below.

TABLE 2

Example 2 in mm f = 2.66
Fno = 2.31
ω(deg) = 40.3
ih = 2.29
TLA = 3.30

Surface Data

| Surface No. i | Curvature Radius r | Surface Distance d | Refractive Index Nd | Abbe Number νd |
|---|---|---|---|---|
| (Object Surface) | Infinity | Infinity | | |
| Stop | Infinity | −0.120 | | |
| 1* | 1.229 | 0.481 | 1.5438 | 55.57 |
| 2* | −4.327 | 0.016 | | |
| 3* | −9.499 | 0.190 | 1.6349 | 23.97 |
| 4* | 2.820 | 0.478 | | |
| 5* | −2.084 | 0.740 | 1.5348 | 55.66 |
| 6* | −0.595 | 0.016 | | |
| 7* | 2.585 | 0.335 | 1.5348 | 55.66 |
| 8* | 0.518 | 0.270 | | |
| 9 | Infinity | 0.210 | 1.5168 | 64.20 |
| 10 | Infinity | 0.636 | | |
| Image Plane | Infinity | | | |

Constituent Lens Data

| Lens | Start Surface | Focal Length |
|---|---|---|
| 1 | 1 | 1.815 |
| 2 | 3 | −3.404 |
| 3 | 5 | 1.328 |
| 4 | 7 | −1.283 |

Composite Focal Length

| f12 | 3.177 |
|---|---|
| f34 | 17.649 |

Aspheric Surface Data

| | 1st Surface | 2nd Surface | 3rd Surface | 4th Surface |
|---|---|---|---|---|
| k | 0.000E+00 | 0.000E+00 | 0.000E+00 | −8.445E+01 |
| A4 | −8.215E−02 | 1.458E+00 | 1.692E+00 | 9.998E−01 |
| A6 | 2.087E−01 | −1.110E+01 | −1.050E+00 | −2.697E+00 |

TABLE 2-continued

| | | | | |
|---|---|---|---|---|
| A8 | −9.529E−01 | 3.313E+01 | 2.888E+01 | 4.583E+00 |
| A10 | 0.000E+00 | −4.917E+01 | −3.724E+01 | −1.825E+00 |
| A12 | 0.000E+00 | 2.877E+01 | 1.920E+01 | −1.066E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −4.755E+00 | 0.000E+00 | −5.271E+00 |
| A4 | 1.916E−01 | −3.277E−01 | −5.144E−01 | −2.363E−01 |
| A6 | −9.308E−01 | 4.720E−01 | 5.259E−01 | 2.017E−01 |
| A8 | 2.889E+00 | −4.879E−01 | −6.493E−01 | −1.536E−01 |
| A10 | −7.737E+00 | −1.059E−01 | 5.665E−01 | 7.921E−02 |
| A12 | 1.124E+01 | 5.543E−01 | −2.668E−01 | −2.567E−02 |
| A14 | −6.551E+00 | −2.437E−01 | 6.303E−02 | 4.633E−03 |
| A16 | 0.000E+00 | 0.000E+00 | −5.937E−03 | −3.478E−04 |

As shown in Table 7, the imaging lens in Example 2 satisfies all the conditional expressions (1) to (8).

Figure 4:
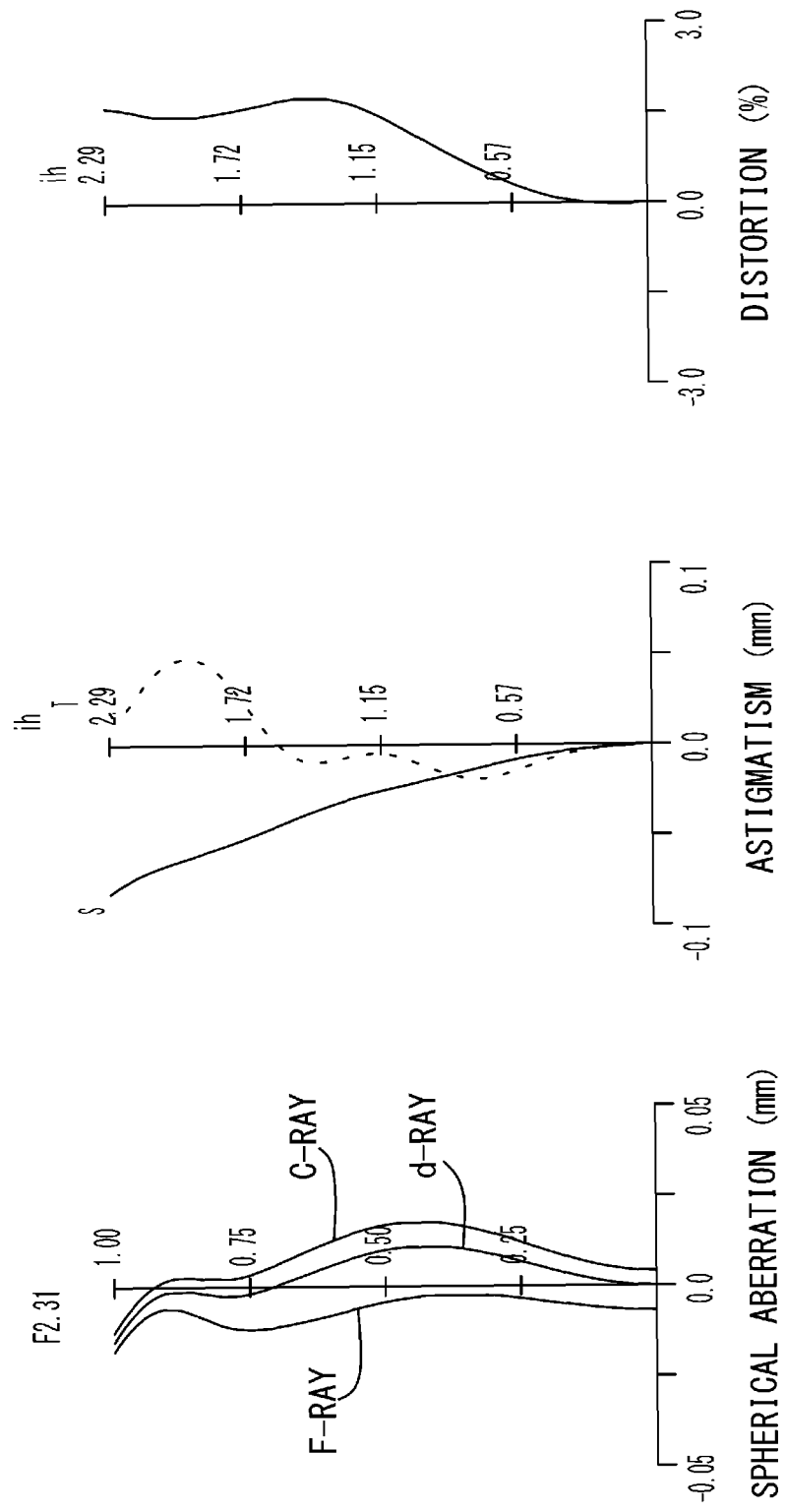
FIG. 4 shows spherical aberration, astigmatism, and distortion of the imaging lens in Example 2.
Figure 5:
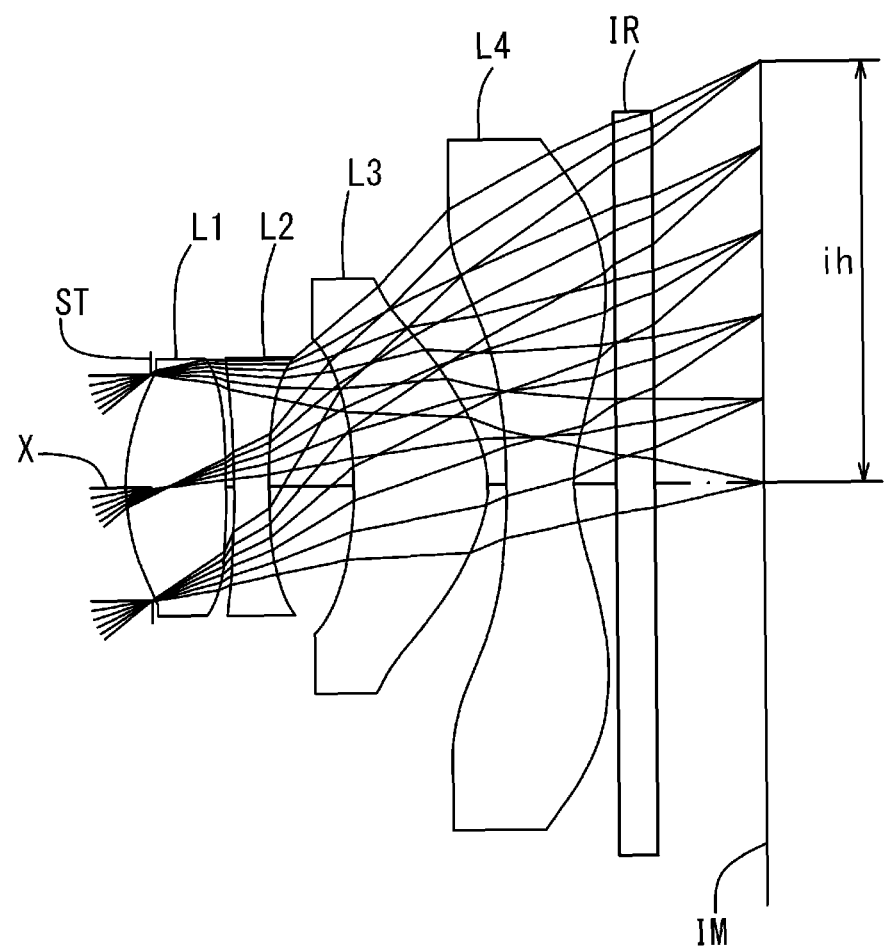
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

In Example 2, total track length TLA is 3.30 mm, suggesting that the imaging lens is compact. Also, the imaging lens provides a wide field of view of about 81 degrees and high brightness with an F-value of about 2.3.

Example 3

The basic lens data of Example 3 is shown in Table 3 below.

TABLE 3

Example 3 in mm f = 2.83
Fno = 2.30
ω(deg) = 38.6
ih = 2.30
TLA = 3.40

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.140 | | |
| 1* | 1.189 | 0.545 | 1.5438 | 55.57 |
| 2* | −5.427 | 0.045 | | |
| 3* | −3.359 | 0.190 | 1.6349 | 23.97 |
| 4* | 7.147 | 0.461 | | |
| 5* | −2.150 | 0.729 | 1.5348 | 55.66 |
| 6* | −0.594 | 0.103 | | |
| 7* | −3.166 | 0.367 | 1.5348 | 55.66 |
| 8* | 0.821 | 0.230 | | |
| 9 | Infinity | 0.210 | 1.5168 | 64.20 |
| 10 | Infinity | 0.593 | | |
| Image Plane | Infinity | | | |

Constituent Lens Data

| Lens | Start Surface | Focal Length |
|---|---|---|
| 1 | 1 | 1.847 |
| 2 | 3 | −3.574 |
| 3 | 5 | 1.319 |
| 4 | 7 | −1.181 |

Composite Focal Length

| | |
|---|---|
| f12 | 3.132 |
| f34 | −251.229 |

TABLE 3-continued

Aspheric Surface Data

| | 1st Surface | 2nd Surface | 3rd Surface | 4th Surface |
|---|---|---|---|---|
| k | 0.000E+00 | 0.000E+00 | 0.000E+00 | 8.324E+00 |
| A4 | −3.709E−02 | 2.212E−01 | 7.280E−01 | 6.501E−01 |
| A6 | 1.364E−01 | −1.065E+00 | −2.127E+00 | −1.209E+00 |
| A8 | −1.355E+00 | −2.899E+00 | −1.063E+00 | 8.995E−01 |
| A10 | 3.465E+00 | 1.207E+01 | 1.167E+01 | 5.665E+00 |
| A12 | −4.725E+00 | −1.177E+01 | −1.158E+01 | −2.133E+01 |
| A14 | 0.000E+00 | 0.000E+00 | 0.000E+00 | 3.785E+01 |
| A16 | 0.000E+00 | 0.000E+00 | 0.000E+00 | −2.623E+01 |

| | 5th Surface | 6th Surface | 7th Surface | 8th Surface |
|---|---|---|---|---|
| k | 0.000E+00 | −3.350E+00 | 2.619E+00 | −8.339E+00 |
| A4 | −1.157E−01 | −1.695E−01 | 2.269E−01 | −1.375E−01 |
| A6 | 7.070E−01 | 1.906E−01 | −7.384E−01 | 7.422E−02 |
| A8 | −3.132E+00 | −6.101E−01 | 9.025E−01 | −5.232E−02 |
| A10 | 5.700E+00 | 1.029E+00 | −5.718E−01 | 3.037E−02 |
| A12 | −4.790E+00 | −9.670E−01 | 2.135E−01 | −1.141E−02 |
| A14 | 1.101E+00 | 6.191E−01 | −4.507E−02 | 2.290E−03 |
| A16 | 0.000E+00 | −1.858E−01 | 4.182E−03 | −1.824E−04 |

As shown in Table 7, the imaging lens in Example 3 satisfies all the conditional expressions (1) to (8).

Figure 6:
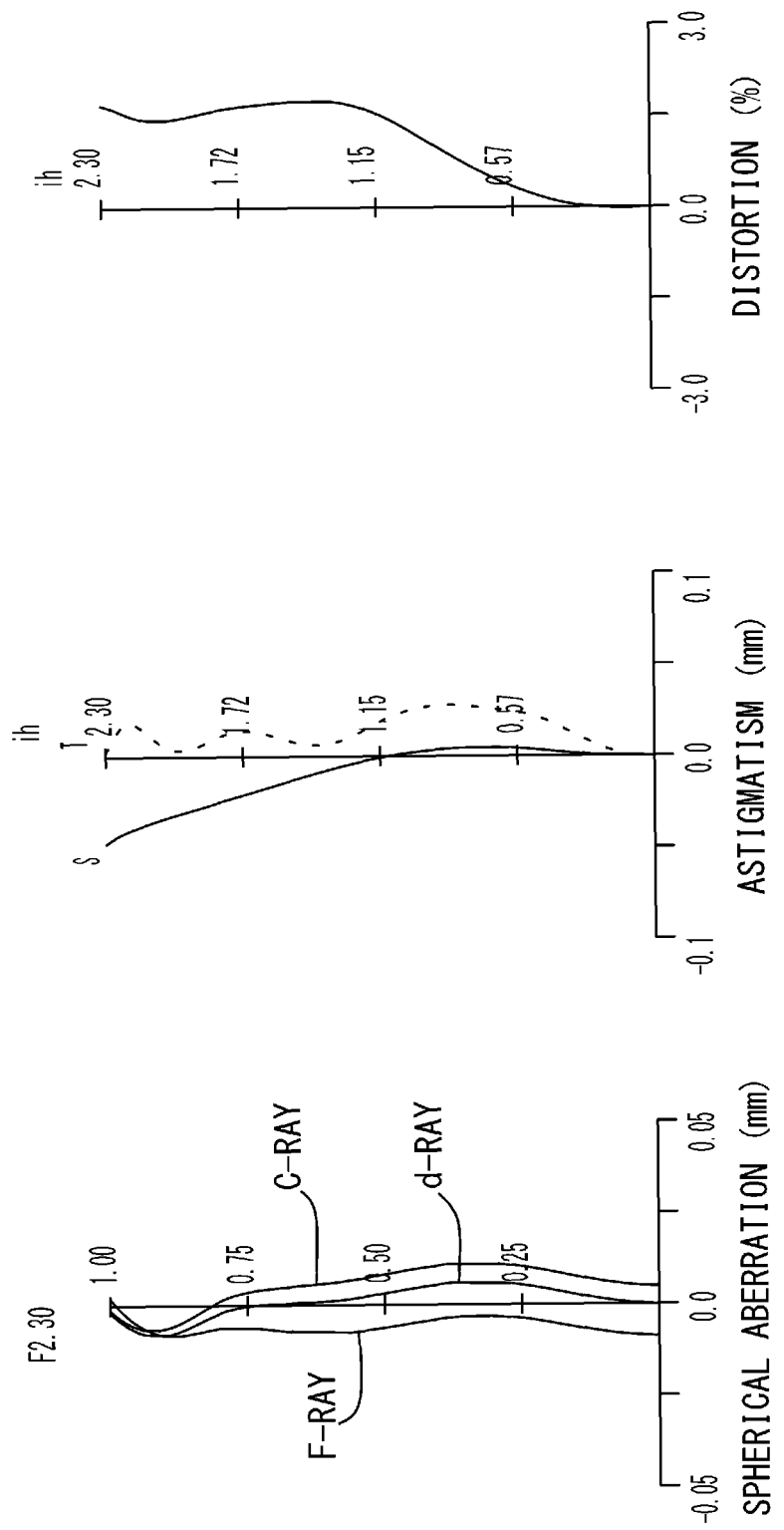
FIG. 6 shows spherical aberration, astigmatism, and distortion of the imaging lens in Example 3.
Figure 7:
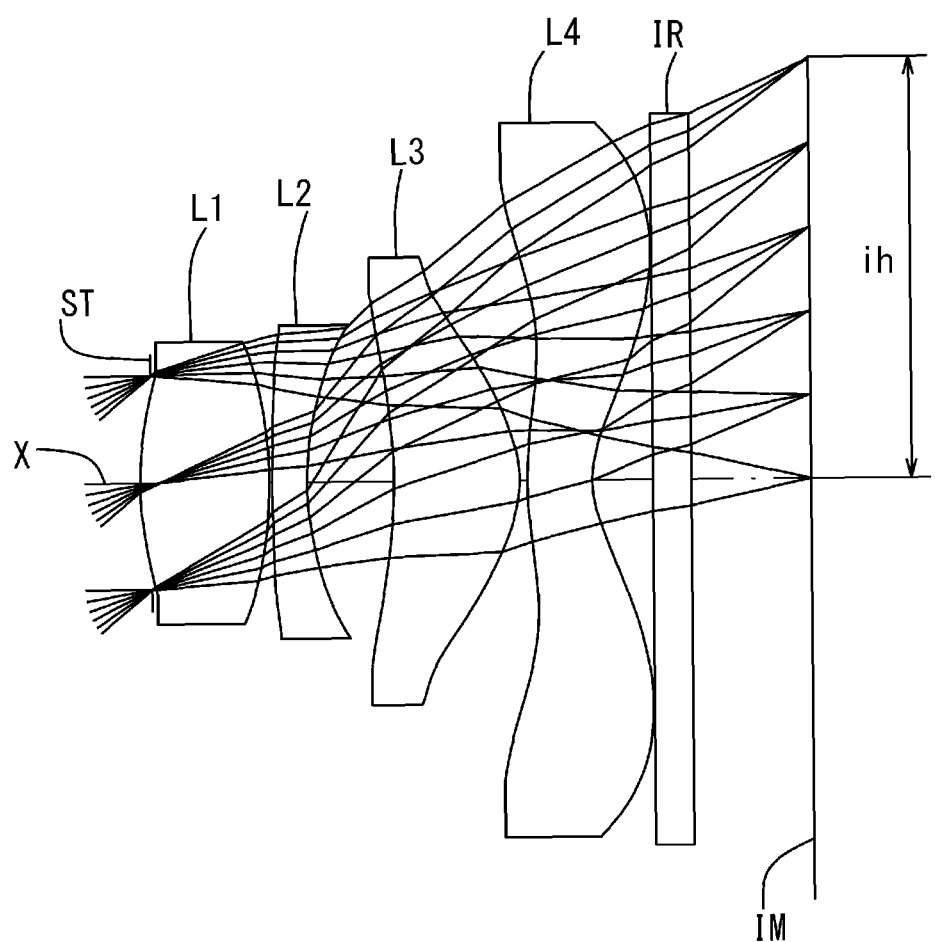
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In Example 3, total track length TLA is 3.40 mm, suggesting that the imaging lens is compact. Also, the imaging lens provides a wide field of view of about 77 degrees and high brightness with an F-value of about 2.3.

Example 4

The basic lens data of Example 4 is shown in Table 4 below.

TABLE 4

Example 4 in mm f = 2.68
Fno = 2.30
ω(deg) = 40.0
ih = 2.29
TLA = 3.58

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.060 | | |
| 1* | 1.856 | 0.702 | 1.5438 | 55.57 |
| 2* | −2.564 | 0.016 | | |
| 3* | 5.695 | 0.190 | 1.6349 | 23.97 |
| 4* | 1.557 | 0.473 | | |
| 5* | −2.612 | 0.684 | 1.5348 | 55.66 |
| 6* | −0.644 | 0.043 | | |
| 7* | 2.082 | 0.353 | 1.5348 | 55.66 |
| 8* | 0.543 | 0.330 | | |
| 9 | Infinity | 0.210 | 1.5168 | 64.20 |
| 10 | Infinity | 0.652 | | |
| Image Plane | Infinity | | | |

Constituent Lens Data

| Lens | Start Surface | Focal Length |
|---|---|---|
| 1 | 1 | 2.097 |
| 2 | 3 | −3.437 |
| 3 | 5 | 1.425 |
| 4 | 7 | −1.491 |

TABLE 4-continued

Composite Focal Length

| | |
|---|---|
| f12 | 4.008 |
| f34 | 6.705 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| P4 | −6.376E−02 | −1.579E−01 | −3.448E−01 | −2.117E−01 |
| A6 | −3.380E−02 | 4.799E−01 | 8.347E−01 | 2.760E−01 |
| A8 | −1.207E−01 | −5.332E−01 | −5.726E−01 | 2.162E−02 |
| A10 | 0.000E+00 | −8.536E−03 | 2.112E−02 | −1.253E−01 |
| A12 | 0.000E+00 | 0.000E+00 | 0.000E+00 | 0.000E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −4.308E+00 | 0.000E+00 | −4.558E+00 |
| P4 | 1.673E−01 | −1.851E−01 | −3.048E−01 | −1.368E−01 |

TABLE 4-continued

| | | | | |
|---|---|---|---|---|
| A6 | −3.012E−01 | 2.020E−01 | 4.931E−02 | 4.998E−02 |
| A8 | 3.276E−01 | −3.056E−01 | 2.808E−02 | −9.423E−03 |
| A10 | −1.236E−01 | 3.281E−01 | 6.462E−03 | −2.415E−03 |
| A12 | 0.000E+00 | −1.092E−01 | −1.768E−02 | 1.933E−03 |
| A14 | 0.000E+00 | 0.000E+00 | 6.816E−03 | −4.712E−04 |
| A16 | 0.000E+00 | 0.000E+00 | −8.452E−04 | 4.178E−05 |

As shown in Table 7, the imaging lens in Example 4 satisfies all the conditional expressions (1) to (8).

Figure 8:
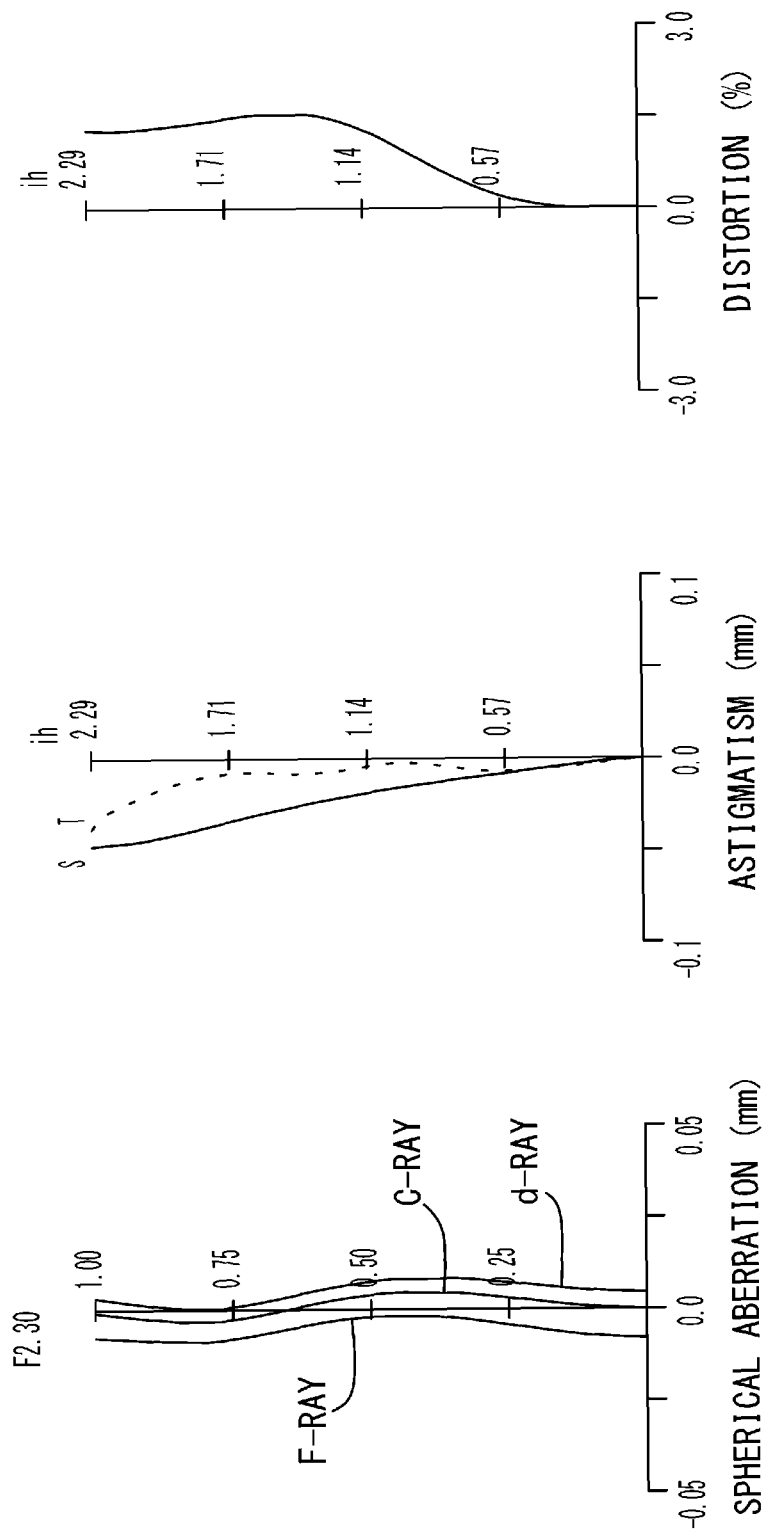
FIG. 8 shows spherical aberration, astigmatism, and distortion of the imaging lens in Example 4.
Figure 9:
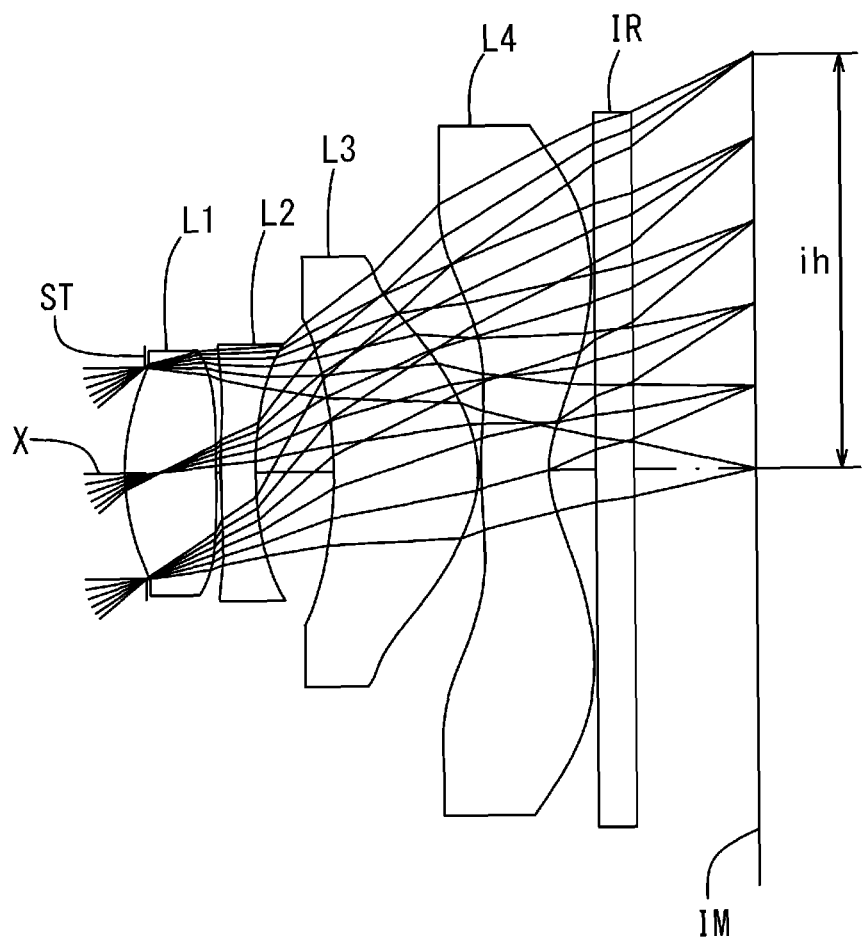
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In Example 4, total track length TLA is 3.58 mm, suggesting that the imaging lens is compact. Also, the imaging lens provides a wide field of view of about 80 degrees and high brightness with an F-value of about 2.3.

Example 5

The basic lens data of Example 5 is shown in Table 5 below.

TABLE 5

Example 5 in mm f = 2.69
Fno = 2.31
ω(deg) = 40.0
ih = 2.28
TLA = 3.41

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.115 | | |
| 1* | 1.283 | 0.502 | 1.5438 | 55.57 |
| 2* | −13.026 | 0.028 | | |
| 3* | 12.004 | 0.190 | 1.6349 | 23.97 |
| 4* | 2.380 | 0.431 | | |
| 5* | −2.341 | 0.795 | 1.5348 | 55.66 |
| 6* | −0.646 | 0.016 | | |
| 7* | 2.628 | 0.374 | 1.5348 | 55.66 |
| 8* | 0.565 | 0.260 | | |
| 9 | Infinity | 0.210 | 1.5168 | 64.20 |
| 10 | Infinity | 0.671 | | |
| Image Plane | Infinity | | | |

Constituent Lens Data

| Lens | Start Surface | Focal Length |
|---|---|---|
| 1 | 1 | 2.175 |
| 2 | 3 | −4.712 |
| 3 | 5 | 1.435 |
| 4 | 7 | −1.437 |

Composite Focal Length

| | |
|---|---|
| f12 | 3.404 |
| f34 | 11.501 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −3.508E−02 | 4.801E−01 | 7.203E−01 | 4.629E−01 |
| A6 | 1.467E−01 | −6.082E+00 | −6.676E+00 | −1.764E+00 |
| A8 | −1.712E+00 | 1.918E+01 | 2.016E+01 | 3.438E+00 |

TABLE 5-continued

| | 5th Surface | 6th Surface | 7th Surface | 8th Surface |
|---|---|---|---|---|
| A10 | 4.703E+00 | −3.018E+01 | −3.003E+01 | 8.854E−01 |
| A12 | −6.693E+00 | 1.840E+01 | 1.924E+01 | −1.273E+01 |
| A14 | 0.000E+00 | 0.000E+00 | 0.000E+00 | 1.809E+01 |
| A16 | 0.000E+00 | 0.000E+00 | 0.000E+00 | −7.426E+00 |

| | 5th Surface | 6th Surface | 7th Surface | 8th Surface |
|---|---|---|---|---|
| k | 0.000E+00 | −3.811E+00 | 0.000E+00 | −4.920E+00 |
| A4 | 1.164E−01 | −1.900E−01 | −6.137E−01 | −2.815E−01 |
| A6 | −2.306E−01 | −4.011E−01 | 5.734E−01 | 2.572E−01 |
| A8 | −6.057E−01 | 1.934E+00 | −4.925E−01 | −1.816E−01 |
| A10 | 2.361E+00 | −3.932E+00 | 3.628E−01 | 8.481E−02 |
| A12 | −2.363E+00 | 4.239E+00 | −1.642E−01 | −2.473E−02 |
| A14 | 5.751E−01 | −2.185E+00 | 3.873E−02 | 4.022E−03 |
| A16 | 0.000E+00 | 4.204E−01 | −3.681E−03 | −2.741E−04 |

As shown in Table 7, the imaging lens in Example 5 satisfies all the conditional expressions (1) to (8).

Figure 10:
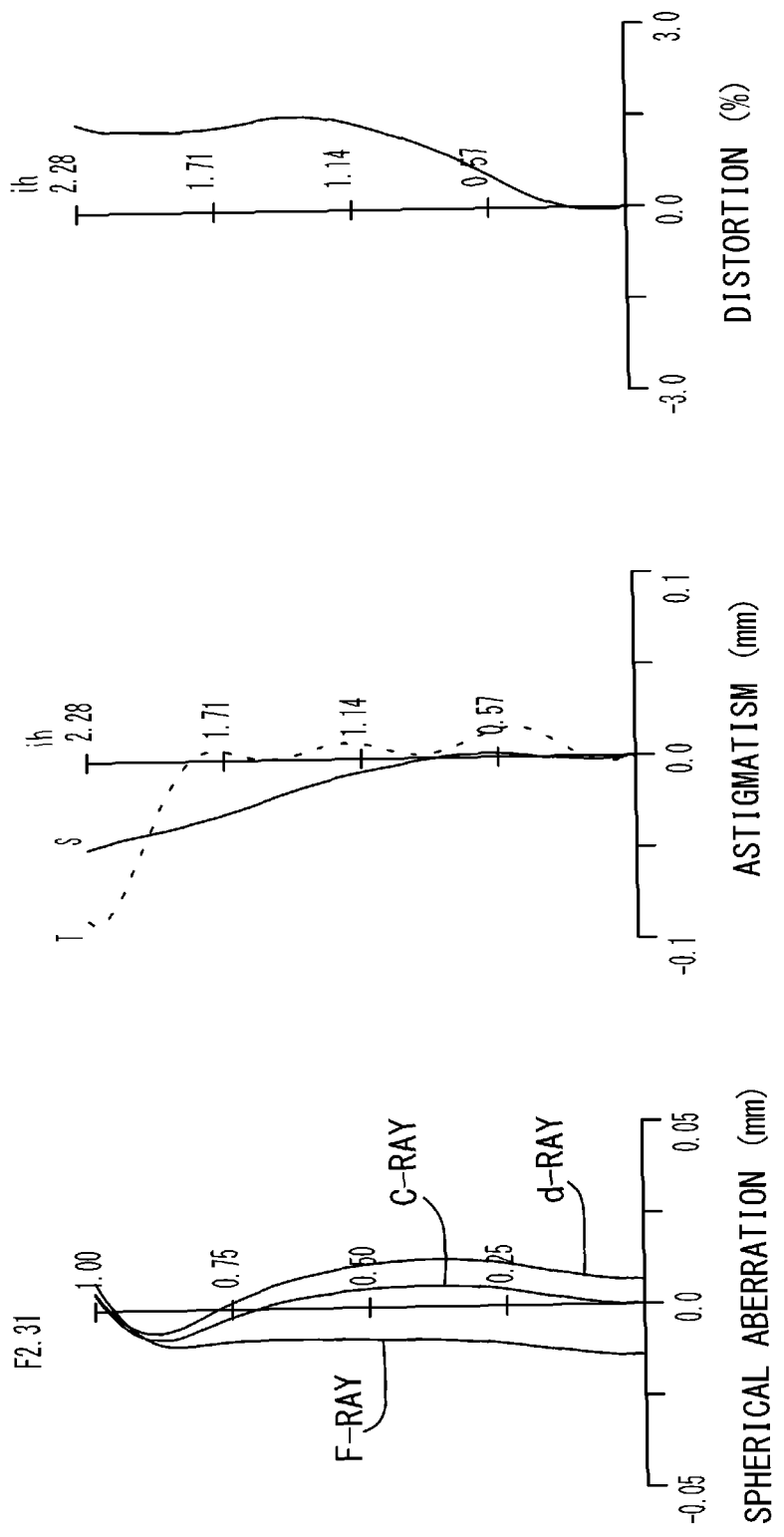
FIG. 10 shows spherical aberration, astigmatism, and distortion of the imaging lens in Example 5.
Figure 11:
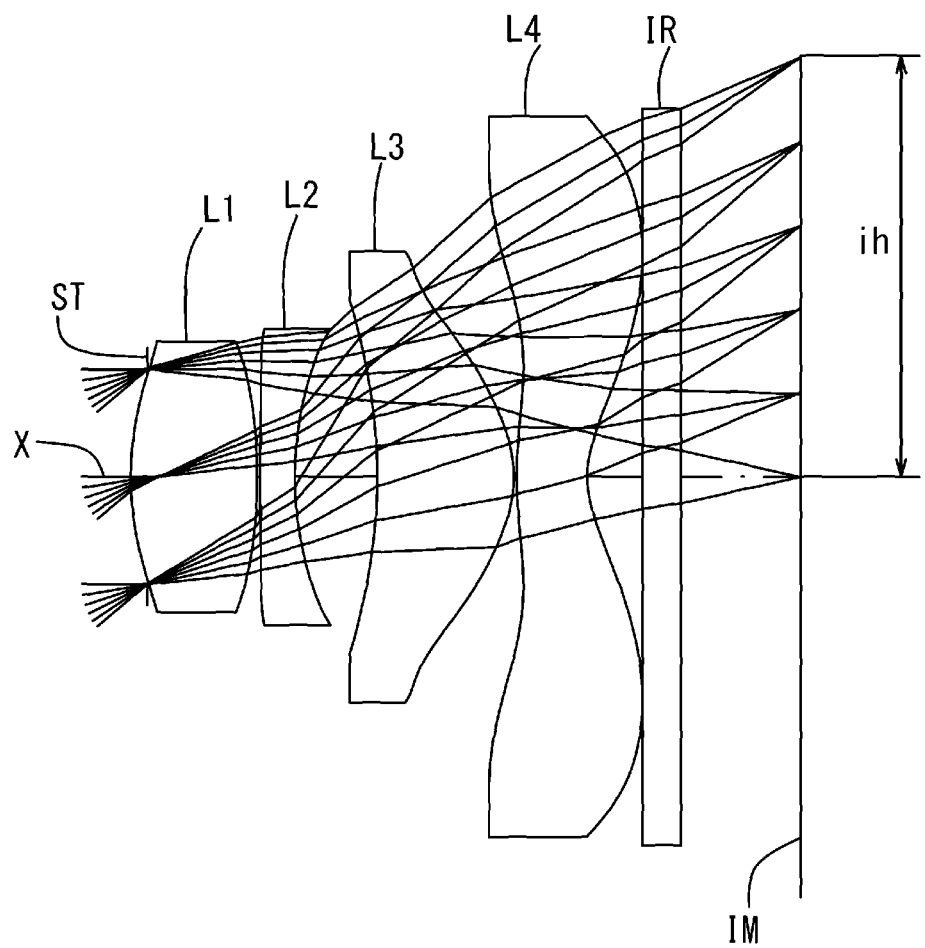
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In Example 5, total track length TLA is 3.41 mm, suggesting that the imaging lens is compact. Also, the imaging lens provides a wide field of view of about 80 degrees and high brightness with an F-value of about 2.3.

Example 6

The basic lens data of Example 6 is shown in Table 6 below.

TABLE 6

Example 6 in mm f = 2.69
Fno = 2.30
ω(deq) = 40.0
ih = 2.29
TLA = 3.58

Surface Data

| Surface No. i | Curvature Radius r | Surface Distance d | Refractive Index Nd | Abbe Number vd |
|---|---|---|---|---|
| (Object Surface) | Infinity | Infinity | | |
| Stop | Infinity | −0.090 | | |
| 1* | 1.654 | 0.687 | 1.5438 | 55.57 |
| 2* | −3.474 | 0.016 | | |
| 3* | 7.265 | 0.190 | 1.6349 | 23.97 |
| 4* | 1.798 | 0.449 | | |
| 5* | −2.705 | 0.743 | 1.5348 | 55.66 |
| 6* | −0.659 | 0.016 | | |
| 7* | 2.214 | 0.384 | 1.5348 | 55.66 |
| 8* | 0.553 | 0.300 | | |
| 9 | Infinity | 0.210 | 1.5168 | 64.20 |
| 10 | Infinity | 0.652 | | |
| Image Plane | Infinity | | | |

Constituent Lens Data

| Lens | Start Surface | Focal Length |
|---|---|---|
| 1 | 1 | 2.163 |
| 2 | 3 | −3.814 |
| 3 | 5 | 1.446 |
| 4 | 7 | −1.498 |

Composite Focal Length

| f12 | 3.853 |
|---|---|
| f34 | 7.426 |

Aspheric Surface Data

| | 1st Surface | 2nd Surface | 3rd Surface | 4th Surface |
|---|---|---|---|---|
| k | 0.000E+00 | 0.000E+00 | 0.000E+00 | 0.000E+00 |
| A4 | −4.756E−02 | −1.587E−01 | −2.207E−01 | −5.637E−02 |
| A6 | −2.120E−02 | −5.257E−02 | −4.325E−02 | −8.342E−02 |
| A8 | −1.478E−01 | 5.446E−01 | 9.343E−01 | 4.008E−01 |
| A10 | 0.000E+00 | −5.691E−01 | −7.138E−01 | −1.919E−01 |
| A12 | 0.000E+00 | 0.000E+00 | 0.000E+00 | 0.000E+00 |
| A14 | 0.000E+00 | 0.000E+00 | 0.000E+00 | 0.000E+00 |
| A16 | 0.000E+00 | 0.000E+00 | 0.000E+00 | 0.000E+00 |

| | 5th Surface | 6th Surface | 7th Surface | 8th Surface |
|---|---|---|---|---|
| k | 0.000E+00 | −4.390E+00 | 0.000E+00 | −4.537E+00 |
| A4 | 1.287E−01 | −2.762E−01 | −4.111E−01 | −1.893E−01 |
| A6 | −3.77E−01 | 2.888E−01 | 1.268E−01 | 1.134E−01 |
| A8 | 5.127E−01 | −3.850E−01 | 8.174E−02 | −5.001E−02 |
| A10 | −2.442E−01 | 4.029E−01 | −7.910E−02 | 1.392E−02 |
| A12 | 0.000E+00 | −1.363E−01 | 2.482E−02 | −2.080E−03 |
| A14 | 0.000E+00 | 0.000E+00 | −2.983E−03 | 6.238E−05 |
| A16 | 0.000E+00 | 0.000E+00 | 4.761E−05 | 1.332E−05 |

As shown in Table 7, the imaging lens in Example 6 satisfies all the conditional expressions (1) to (8).

Figure 12:
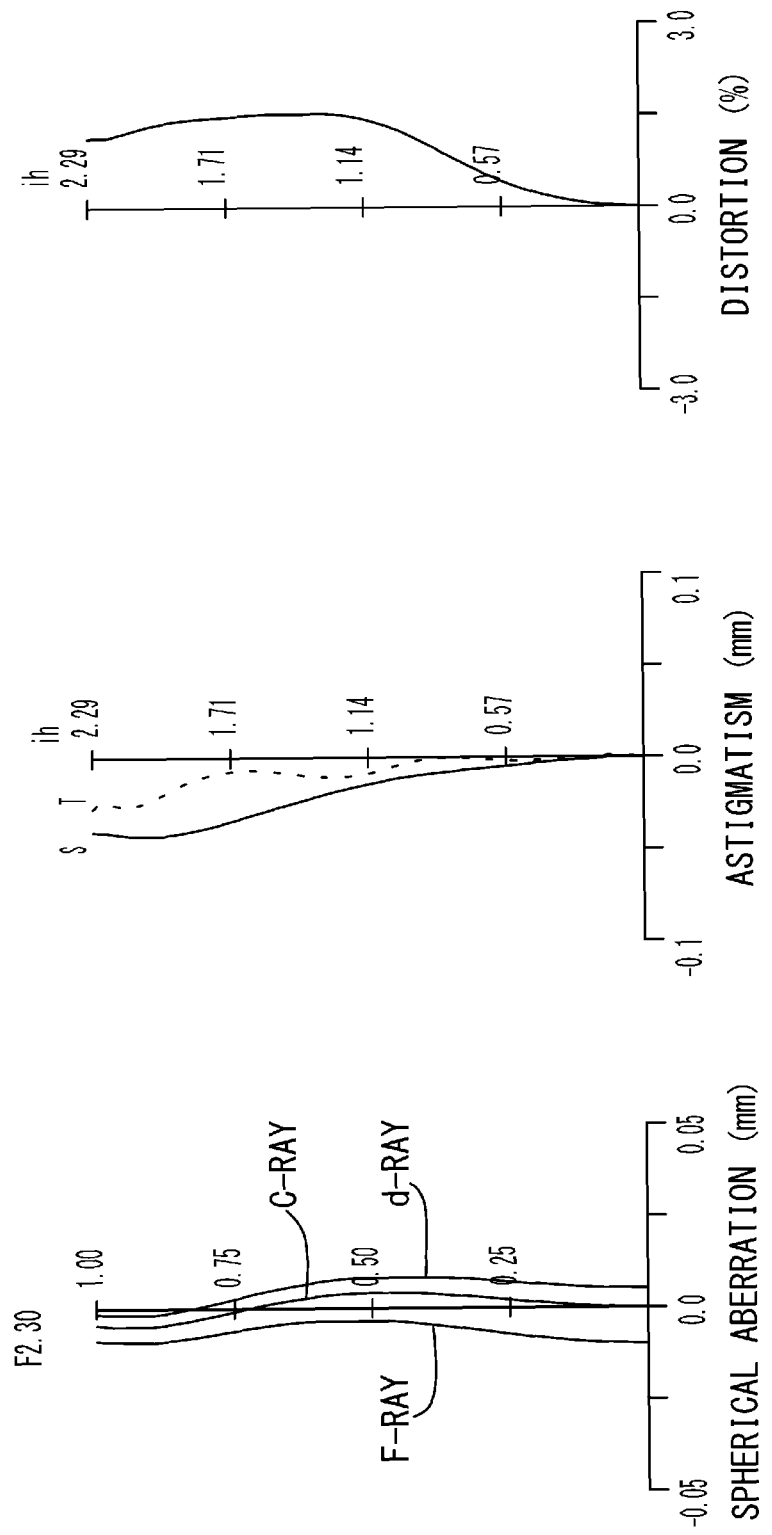
FIG. 12 shows spherical aberration, astigmatism, and distortion of the imaging lens in Example 6.

FIG. 12 shows spherical aberration (mm), astigmatism (mm), and distortion (%) of the imaging lens in Example 6. As shown in FIG. 12, each aberration is corrected properly.

In Example 6, total track length TLA is 3.58 mm, suggesting that the imaging lens is compact. Also, the imaging lens provides a wide field of view of about 80 degrees and high brightness with an F-value of about 2.3.

Table 7 shows data on Example 1 to Example 6 in relation to the conditional expressions (1) to (8).

TABLE 7

| | Example 1 | Example 2 | Example 3 | Example 4 | Example 5 | Example 6 |
|---|---|---|---|---|---|---|
| Conditional Expression (1) $0.8 < ih/f < 0.95$ | 0.82 | 0.86 | 0.81 | 0.85 | 0.85 | 0.85 |
| Conditional Expression (2) $TLA/2ih < 0.9$ | 0.74 | 0.72 | 0.74 | 0.78 | 0.75 | 0.78 |
| Conditional Expression (3) $-4.0 < r3/r4 < 6.0$ | −0.31 | −3.37 | −0.47 | 3.66 | 5.04 | 4.04 |
| Conditional Expression (4) $1.1 < f1/f3 < 1.6$ | 1.34 | 1.37 | 1.40 | 1.47 | 1.52 | 1.50 |
| Conditional Expression (5) $2.0 < f2/f4 < 4.0$ | 2.84 | 2.65 | 3.02 | 2.31 | 3.28 | 2.55 |
| Conditional Expression (6) $-4.5 < r3/f < 5.5$ | −1.06 | −3.57 | −1.19 | 2.12 | 4.47 | 2.70 |
| Conditional Expression (7) $2.8 < r5/r6 < 5.0$ | 3.47 | 3.50 | 3.62 | 4.06 | 3.62 | 4.10 |
| Conditional Expression (8) $-0.05 < f12/f34 < 0.80$ | 0.02 | 0.18 | −0.01 | 0.60 | 0.30 | 0.52 |

As explained so far, the imaging lenses according to the examples of the present invention are compact with total track length TLA of about 3.5 mm and provide a wide field of view of 77 degrees or more and high brightness with an F-value of 2.4 or less and correct various aberrations properly.

When any one of the imaging lenses according to the examples of the present invention is used for an optical system built in an image pickup device mounted in an increasingly compact and low-profile mobile terminal such as a smartphone, mobile phone or PDA (Personal Digital Assistant), or a game console or an information terminal such as a PC or a home appliance or a wearable device, it contributes to compactness and performance enhancement of the camera concerned.

The effects of the present invention are as follows.

According to the present invention, there is provided an imaging lens which meets the demand for compactness, corrects various aberrations properly with a small F-value and offers a wide field of view.

What is claimed is:

1. An imaging lens in which elements are arranged in order from an object side to an image side, comprising:
    an aperture stop;
    a first lens with positive refractive power having a convex surface on the object side and the image side;
    a second lens with negative refractive power having a concave surface on the image side;
    a third lens with positive refractive power as a meniscus lens having a convex surface on the image side; and
    a fourth lens with negative refractive power as a double-sided aspheric lens having a concave surface on the image side,
    wherein an F-value is smaller than 2.4; and
    conditional expressions (1) (2b), and (3) below are satisfied:

$$0.8 < ih/f < 0.95 \qquad (1)$$

$$TLA/2ih < 0.78 \qquad (2b)$$

$$-4.0 < r3/r4 < 6.0 \qquad (3)$$

where
    ih: maximum image height
    f: focal length of an overall optical system of the imaging lens
    TLA: distance on an optical axis from an object-side surface of an optical element located nearest to an object to an image plane without a filter or the like
    r3: curvature radius of the object-side surface of the second lens
    r4: curvature radius of the image-side surface of the second lens.

2. The imaging lens according to claim 1, wherein a conditional expression (4) below is satisfied:

$$1.1 < f1/f3 < 1.6 \qquad (4)$$

where
    f1: focal length of the first lens
    f3: focal length of the third lens.

3. The imaging lens according to claim 1, wherein a conditional expression (5) below is satisfied:

$$2.0 < f2/f4 < 4.0 \qquad (5)$$

where
    f2: focal length of the second lens
    f4: focal length of the fourth lens.

4. The imaging lens according to claim 1, wherein a conditional expression (6) below is satisfied:

$$-4.5 < r3/f < 5.5 \qquad (6)$$

where
    r3: curvature radius of the object-side surface of the second lens
    f: focal length of an overall optical system of the imaging lens.

5. The imaging lens according to claim 1, wherein a conditional expression (7) below is satisfied:

$$2.8 < r5/r6 < 5.0 \qquad (7)$$

where
    r5: curvature radius of the object-side surface of the third lens
    r6: curvature radius of the image-side surface of the third lens.

6. The imaging lens according to claim 1,
wherein a conditional expression (8) below is satisfied:

$$-0.05 < f12/f34 < 0.80 \qquad (8)$$

where
f12: composite focal length of the first lens and the second lens
f34: composite focal length of the third lens and the fourth lens.

* * * * *